United States Patent [19]
Konishi

[11] 3,975,615
[45] Aug. 17, 1976

[54] VERTICAL POSITION WELDING METHOD AND APPARATUS FOR PRACTICING THE METHOD

[75] Inventor: Shinichi Konishi, Kawagoe, Japan

[73] Assignee: Denyo Kabushiki Kaisha, Tokyo, Japan

[22] Filed: Aug. 19, 1975

[21] Appl. No.: 605,820

[30] Foreign Application Priority Data
Aug. 22, 1974 Japan............................ 49-95548

[52] U.S. Cl. ............................ 219/126; 219/121 P
[51] Int. Cl.² ........................................ B23K 9/12
[58] Field of Search ....................... 219/126, 121 P

[56] References Cited
UNITED STATES PATENTS
3,612,817  10/1971  Tichelaar ............................ 219/126
3,806,695  4/1974  Carroll ............................ 219/126
FOREIGN PATENTS OR APPLICATIONS
1,340,794  12/1973  United Kingdom ............. 219/121 P

*Primary Examiner*—E. A. Goldberg
*Attorney, Agent, or Firm*—Haseltine, Lake & Waters

[57] ABSTRACT

In a vertical position welding method and an apparatus for practicing the method, front and rear water-cooling type backing shoes are slidably positioned on the front and rear surfaces of metal plates to be butt-welded, respectively, so as to form a welding space in a groove formed by the adjacent edges of the metal plates. A consumable electrode is continuously fed into the welding space, while a plasma arc generating torch fixedly provided on the backing shoe in contact with the front surface of the work generates a plasma arc to melt the adjacent edges of the metal plates to be welded, and the backing shoes and the torch are moved upward at the same speed to move the welding space in response to the melting rates of the work and the consumable electrode, thus achieving the welding of the metal plate in vertical position. Furthermore, the torch is tilted to facilitate the melting of the metal plates.

9 Claims, 3 Drawing Figures

VERTICAL POSITION WELDING METHOD AND APPARATUS FOR PRACTICING THE METHOD

BACKGROUND OF THE INVENTION

This invention relates to a vertical position welding method for butt-welding base metals, or steel plates, and to a welding apparatus for practicing the method.

An electroslag welding method and an electrogas welding method are known as automatic vertical position welding, and are popularly employed especially in the field of shipbuilding because these welding methods are suitable for welding large structures on the spot, and are advantageous in that, for instance, the welding operation can be readily achieved, and the weld is scarcely deformed.

However, the conventional vertical position welding methods have a common difficulty that metal plates to be welded must be heated at very high temperture, which leads to the deterioration of the physical properties, such as impact values, of the portions of the metal plates affected by the heat.

In other words, in the conventional electro-slag or electro-gas welding method, the welding is conducted by maintaining the relationships between the melting of the metal plates and the melting of the welding wire suitable by feeding electric current between the welding wire and the metal plates (referred to as the work when applicable) and therefore a groove formed by the edges of the metal plates should have a relatively large width and the welding wire also should have a relatively large diameter so that the melting rate (that is, the welding rate) of the welding wire may not be greater than the melting rate of the work. This means that the welding must be conducted at a low speed so that the edges of the plates to be welded are sufficiently molten.

The fact that a welding groove has a large width is convenient for inserting a welding wire into the groove, but is undesirable due to the following reasons: It is obvious that a welding rate in the case of a wide groove is smaller than that in the case of a narrow groove, which leads to the application of excessive heat to the work. As a result, the quantity of metal molten from the work increases, and the physical properties of the weld in the work are deteriorated. Thus, it is impossible to employ the electro-slag or electro-gas welding method for welding materials such as thick plates, high-tension steels, and alloy steels which are greatly affected by heat.

Especially, the electro-slag welding, being a resistance welding utilizing molten slag, has a difficulty that the depth of penetration is insufficient at the start of welding, that is, lack of fusion is liable to be produced, which must be repaired by other welding method.

In order to solve the problems described above, recently a narrow gap welding method has been proposed in which the width of a groove formed by metal plates to be welded is relatively small, and heat applied to the work is reduced by using a small current so as to prevent the deterioration of the physical properties of the work.

However, this narrow gap welding method also has difficulties. That is, in this method, it is necessary to oscillate a welding arc by an arc oscillating mechanism or to conduct a multiple pass welding, and its welding current cannot be increased and therefore the welding rate cannot be increased. That is, in this method, the reduction of heat applied to the work causes the lowering of its welding effeciency, and therefore the application of the narrow gap welding method is limited.

The above-described difficulties accompanying the conventional methods have been overcome by the provision of a vertical position welding method and a first welding apparatus practicing the method according to this invention. However, this apparatus should have been improved, because, in this apparatus, a plasma arc generating torch, or a non-consumable electrode torch is perpendicular to the plane of the work, and therefore an arc is liable to be produced between the torch and a molten metal pool in a groove, which is formed by the edges of metal plates to be welded, at the middle of the groove. As a result, it is impossible to sufficiently apply the energy of an plasma arc generated by the torch to the rear surface of the work, which leads to the production of cold laps on the rear surface of the work.

Referring back to the conventional vertical position welding apparatus, metal plates are molten by a plasma arc generated between a non-consumable electrode torch and the edges of the metal plates forming a groove therebetween, and metal molten from the groove forms a molten metal pool with an additive metal while the torch, that is, the plasma arc is moved upward. This molten metal pool is solidified to form beads. However, in the conventional apparatus, the position of the plasma arc is relatively far apart from the position of the molten metal, and undercuts are therefore liable to be produced. That is, it is necessary to provide a welding apparatus for practicing the vertical position welding method whose torch can be set to the groove as close as possible.

This object has been achieved by a welding apparatus provided according to another aspect of this invention, as will become apparent from the following detailed description. However, as the electrode of a non-consumable electrode torch is not electrically insulated from a front holding member or a front backing shoe in contact with the work, an arc tends to occur between the electrode and the front holding member, which leads to the insufficient application of the plasma arc to the work. Therefore this problem must be also solved.

SUMMARY OF THE INVENTION

Accordingly, it is an object of this invention to provide a vertical position welding method and a welding apparatus for practicing the method in which all of the above-described problems accompanying a conventional vertical position welding are solved.

More specifically, an object of the invention is to provide a vertical position welding method and a welding apparatus for practicing the method in which satisfactory fusion is produced also at the start of welding, heat being uniformly applied to the edges of metal plates to be butt-welded, a groove formed by the adjacent edges of the metal plates being relatively narrow, a large electric current being employed for the welding, a welding rate being increased.

Another object of the invention is to provide a vertical position welding apparatus in which an non-consumable electrode torch for generating a plasma arc is tilted with respect to the surface of metal plate to be butt-welded thereby to facilitate the melting of the metal plates and thereby to prevent the production of cold laps.

A further object of the invention is to provide a vertical position welding apparatus in which the nozzle of a non-consumable electrode torch for generating a plasma arc and a water-cooling type holding member or a backing shoe in contact with the front surface of the work for forming a welding space in the groove of the work with a second holding member are formed into one unit to bring the plasma arc to a molten metal pool formed in the welding space as close as possible, and thereby to prevent the production of undercuts.

A still further object of the invention is to provide a vertical position welding apparatus in which the electrode of a non-consumable electrode torch for generating a plasma arc is electrically insulated from a front holding member or a front backing shoe adapted to slidably hold the groove of the work with a rear holding member or a rear backing shoe for forming a welding space in the groove, in order to facilitate the melting of the work and to prevent the damage of a restraining nozzle in the torch.

The manner in which the foregoing objects and other objects are achieved by this invention will become more apparent from the following detailed description and the appended claims when read in conjunction with the accompanying drawings in which like parts are designated by like reference numerals or characters.

DETAILED DESCRIPTION OF THE INVENTION

Figure 1:
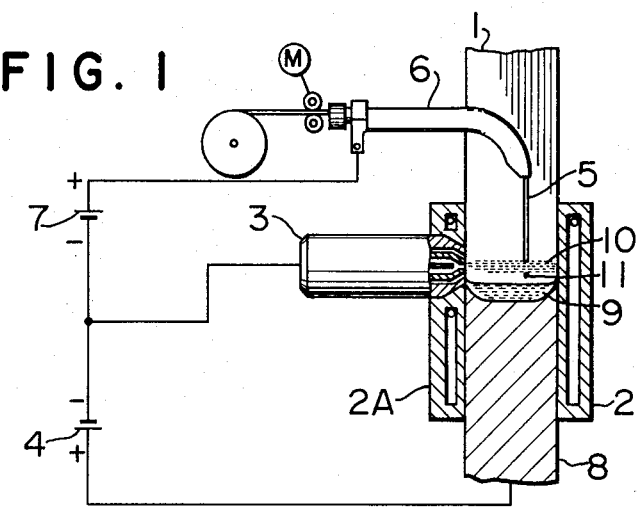
FIG. 1 is an explanatory diagram (partly as a sectional view) illustrating a first example of a vertical position welding apparatus according to this invention.

In a first example of a vertical position welding apparatus for butt-welding plates according to this invention, as shown in FIG. 1, base metals or metal plates 1 (only one plate shown, and referred to as the work when applicable) to be joined together are positioned to form an "I"-shaped narrow grooves between the edges thereof, and front and rear holding members or front and rear backing shoes 2A and 2 slidably hold the front surface and the rear surface of the work respectively, in such a manner that the two holding members 2A and 2 define a welding space in the groove and a molten metal 9 is pooled in the welding space. The holding members 2A and 2 are made of copper and are of the water cooling type. A non-consumable electrode torch, or a plasma arc generating torch 3 is fixedly provided in the upper portion of the holding member 2A in such a manner that the nozzle section comprising a restraining nozzle and a shielding nozzle of the torch is inserted into a through-hole in the holding member 2A and that the direction of the torch 3 is perpendicular to a surface of the holding member 2A in contact with the front surface of the work. All of the torch 3 and the holding members 2A and 2 are moved upward by a suitable mechanism (not shown) with the advancement of the welding.

The non-consumable electrode torch 3 is connected to the negative terminal of a first welding d.c. source 4, and the steel plates 1 are connected to the positive terminal of the same 4 so that a plasma arc is produced in the narrow groove. A consumable electrode 5, which is a welding wire fed through a wire feeding motor M, rollers and a wire guide tube 6, is inserted into the welding space, and is molten by an arc generated between the consumable electrode 5 and the torch 3 to fill the welding space with the metal 9 thus molten. For this purpose, the electrode 5 is connected to the positive terminal of a second welding d.c. source 7, and the non-consumable electrode torch 3 is further connected to the negative terminal of the same 7. In the figure, reference numeral 11 is designated to indicate particle transfer of the consumable electrode 5.

The first welding d.c. source 4 causes the non-consumable electrode torch 3 to generate a plasma arc 10 between the work and the torch 3, thereby melting the adjacent edge portions of the metal plates in the direction of the thickness thereof, while the non-consumable electrode torch 3 and the holding members 2 and 2A are moved upward by the suitable mechanism at the same speed. In cooperation with this operation, the consumable electrode 5 is continuously fed, but is moved upward to fill the welding space with its molten metal as the welding space is continuously moved upward. More specifically, the second welding d.c. source 7 generates an arc between the consumable electrode 5 and the non-consumable electrode torch 3 to melt the consumable electrode 5. This electrode 5 is continuously moved upward while being thus molten, thereby to form a bead 8 with the molten metal 9 of the steel plates 1. Thus, the vertical position welding is accomplished.

In this welding operation, it is unnecessary to strictly determine a point in the welding space at which the non-consumable electrode torch 3 should aim, that is, a satisfactory welding result is obtained if the point aimed by the torch 3 is within the welding space, because the torch is employed merely for melting the steel plates with its plasma arc.

The rate of feeding the welding wire 5 to the welding space is determined depending on a melting rate at which the adjacent edges of the base metals 1 are completely molten by the plasma flame generated by the torch 3, so that the quantity of molten metal produced from the consumable electrode 5 by the second welding d.c. source 7 fills the welding space suitably for the welding operation.

According to the invention, the electric source 7 for generating an arc to melt the consumable electrode 5, and the electric source 4 for generating a plasma arc to melt the base metals are controlled independently of each other, which leads to the elimination of lack of fusion which is liable to be produced at the start of welding in the conventional vertical position welding method.

Furthermore, the plasma arc of the non-consumable electrode torch which is a linear heating source is employed for melting the plates to be butt-welded, according to the invention. Therefore, in the welding method of this invention, the edges of the metal plates to be joined together can be uniformly heated without the oscillation of the torch, that is, the metal heating efficiency in the invention is excellent. In addition, the provision of the torch outside the welding space makes it possible to make the width of the groove (or the distance between the adjacent edges of the base metals) smaller. Moreover, no arc is caused between the welding wire and the base metal in melting the consumable electrode, and therefore the lack of fusion due to the improper position of the welding wire, can be prevented.

Thus, the vertical position welding method according to this invention has various merits: it can achieve vertical position welding with high quality; the use of the linear heat source makes it possible to perform welding with large current which has been impossible in the conventional narrow gap welding method; and the welding rate is approximately twice as fast as that of the conventional welding method.

In a second example of the vertical position welding apparatus according to the invention, a nozzle section of a plasma arc generating torch can be set close to metal plates to be butt-welded so that the plasma arc is brought to a molten metal pool in a groove formed by the edges of the metal plates, and the torch is tilted to facilitate the melting of the metal plates, according to another aspect of the invention.

For the simplification of a description, only the parts which are different from those in FIG. 1 or were not described in detail with reference to FIG. 1 will be described.

Figure 2:
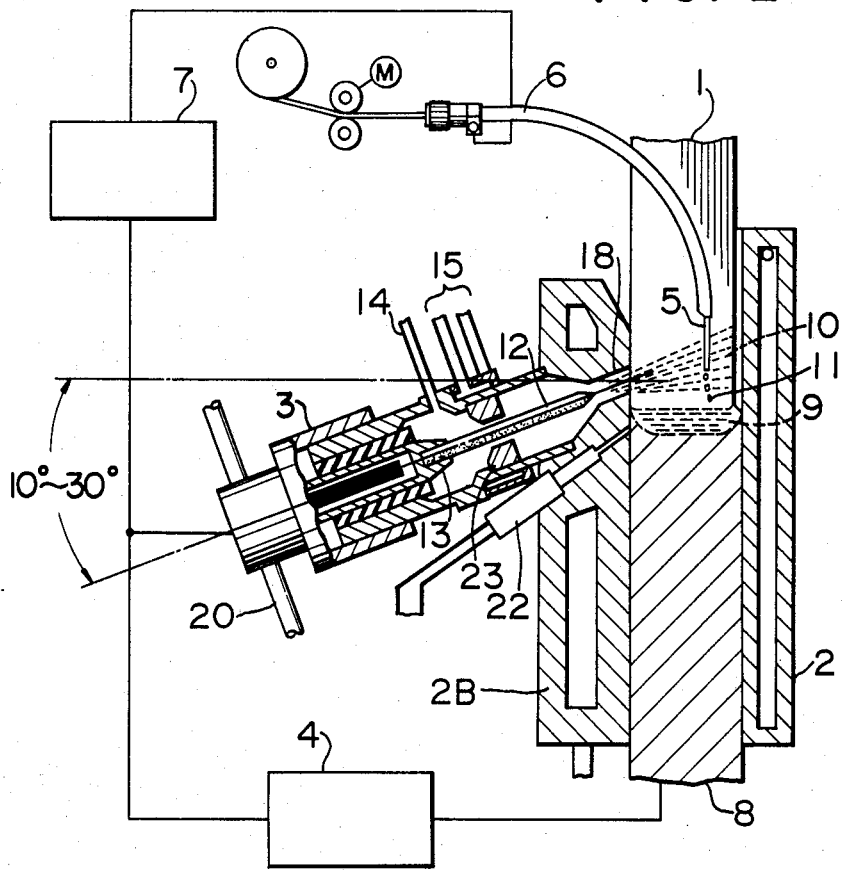
FIG. 2 is a sectional view (partly as a block diagram) illustrating a second example of the vertical position welding apparatus according to the invention.

The torch 3, as shown in FIG. 2, comprises: an electrode 12 supported by an electrode holder 13; electrode cooling pipes 20 for water-cooling the electrode 12; a plasma gas tube 14 for applying a plasma gas to the electrode 12; water-cooling pipes 15 for cooling the body of the torch; an orifice member 23 through which the electrode 12 extends; and a front holding member 2B which serves for its original purpose and as a nozzle of the torch 3.

Although a non-consumable electrode torch, or a plasma arc generating torch has a nozzle section comprising a restraining nozzle arranged to surround the end portion of the electrode and a shielding nozzle surrounding the restraining nozzle, in the example shown in FIG. 2 the nozzle section and the front holding member shown in FIG. 1 are combined into one unit, that is, the front holding member 2B shown in FIG. 2. The holding member 2B has an outlet 18 for blowing out the plasma arc flow generated by the torch 3. The diameter of one end of the outlet 18 in contact with the work 1 is smaller than that of the opposite end so that the outlet 18 operates as a nozzle. Since the body of the torch 3 and the electrode 12 are cooled with water, the front holding member 2B and accordingly the outlet 18 are cooled.

With the welding apparatus thus organized, as is apparent from FIG. 2, it is possible to bring the plasma arc close to the molten metal pool in the groove of the work so that metal molten from the edges of the metal plates to be butt-welded is combined with the molten metal in the molten metal pool before it is solidified, which leads to the prevention of the generation of undercuts in the weld.

As was described before, the non-consumable electrode torch 3 is tilted backward forming an angle of from 10° to 30° with a line perpendicular to the plane of the work (the angle being referred to as torch forwarding angle when applicable). The provision of the torch in this manner has two merits: one is to improve a plasma arc generating condition, and the other is to facilitate the melting of the consumable electrode 5.

The reason for the first merit is as follows: When a plasma arc is produced in the groove, a magnetic blow occurs with respect to the arc. Therefore, even if the torch is set perpendicular to the surface of the work, the arc is directed toward the molten metal pool, as a result of which it appears between the molten metal pool and the torch, and therefore the plasma arc cannot melt the base metals to the bottom of the groove. However, if the torch 3 is tilted as shown in FIG. 2, the distance between the arc and the molten metal pool is increased, and therefore such arc is not produced between the molten metal pool and the torch.

The reason for the second merit is as follows: The metal molten from the consumable electrode should be transferred to the work in a streaming state instead of a drop state or a spray state, that is, the metal molten from the consumable electrode should be streamed into the work. This is the most suitable state of the molten metal in transferring to the work, and this state is obtained by producing the arc on the side wall portion of the consumable electrode. Accordingly, when the consumable electrode is fed into the groove from above, the plasma arc generated by the torch should be applied to the consumable electrode in such a manner that a point of the consumable electrode at which the plasma arc aims is slightly above the end thereof. For this purpose, the torch is tilted as described above.

With the torch 3 thus tilted, the energy of the plasma arc can reach the bottom of the groove, and therefore, no cold laps are created on the rear side of the work, that is, a satisfactory weld can be obtained.

If the torch forwarding angle is made greater than 30° then undercuts are produced on the rear side of the work, and lack of fusion is liable to be produced.

Figure 3:
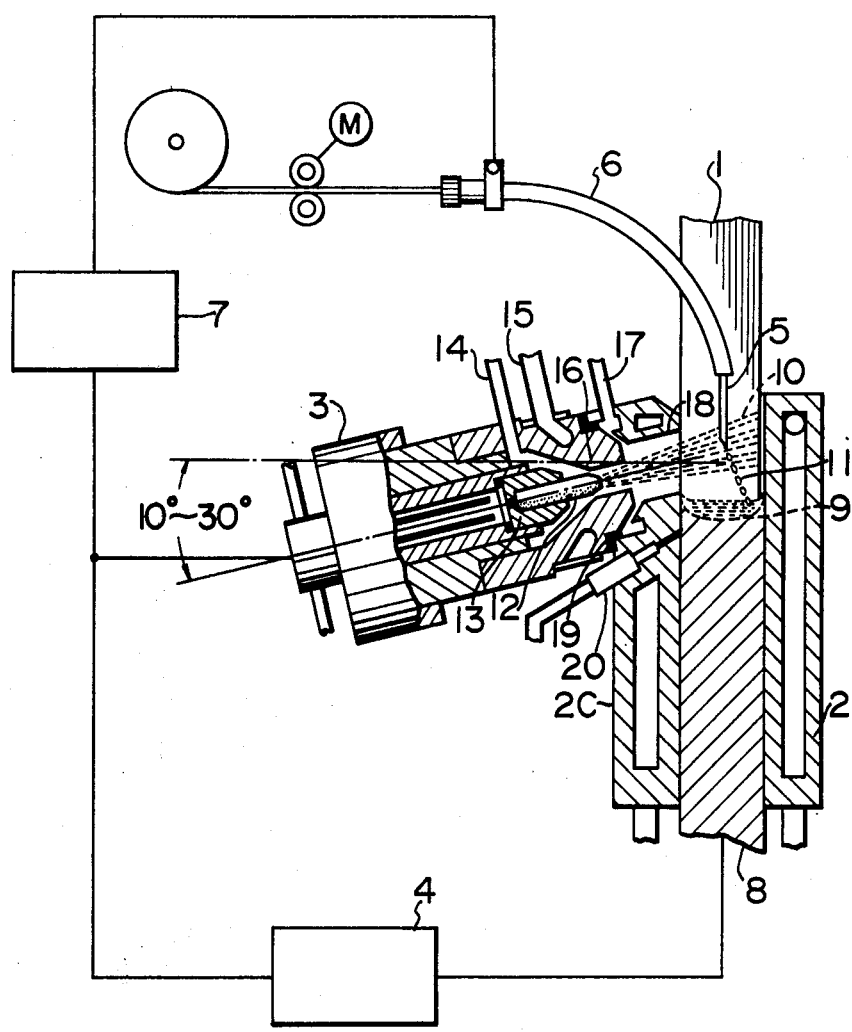
FIG. 3 is also a sectional view (partly as a block diagram) illustrating a third example of the vertical position welding apparatus according to the invention.

A third example of this invention, as shown in FIG. 3, is similar to the second example shown in FIG. 2 except that the torch 3 is provided with a restraining nozzle 16 surrounding the electrode 12 with a space therebetween, the nozzle 16 being cooled by water introduced through a cooling water pipe 15, and a front holding member 2C which, according to the invention, serves as a holding member forming a welding space in the groove of the work and also as a shielding nozzle. The upper end portion of the front holding member 2C serves as the shielding nozzle, and is mounted on the restraining nozzle 16 through an insulating material so that the restraining nozzle and accordingly the electrode 12 are electrically insulated from the front holding member 2C and accordingly from the work 1. Furthermore, a shielding gas pipe 17 is connected to the front holding member for supplying an inert gas to the shielding nozzle section thereof.

Referring back to FIG. 2, in the second example, no shielding gas nor shielding nozzle is employed, and the water cooling type holding member 2B operates as a restraining nozzle to control the plasma arc, and furthermore the holding member 2B is not insulated from the work. Therefore, if the plasma arc is restrained too much by the nozzle in the front holding member 2B, the arc is liable to occur between the holding member 2B and the electrode 12, and therefore it is rather difficult to effectively supply the energy of the plasma arc to the work. However, in the third example shown in FIG. 3, the plasma arc is scarcely produced between the electrode 12 and the front holding member 2C because the latter 2C is electrically insulated from the electrode by the provision of the insulating material 19. Accordingly, the metal plates can be more effectively melted by the plasma arc flow 10 when compared with the case of the second example. In addition, the restraining nozzle will never be damaged.

As is shown in FIG. 2 (or 3) a photo-sensitive means, or a photo-transistor 22, is provided in a light detecting hole of the front holding member 2B, the light detecting hold being slightly below the nozzle of the torch 3.

The photo transistor 22 receives light from the arc and the red-hot metal and converts the light thus received into an electrical signal to control the operation of the wire feeding motor M.

More specifically, the position of the light detecting hole is determined in advance so that it is in the vicinity of a molten metal pool in a normal welding operation. When the feeding rate of the welding wire 5 is smaller than the upward moving rate of the torch 3, and accordingly the position of the molten metal pool is lower than the position of the light detecting hole, the photo transistor 22 operates to receive the light of the plasma arc, and to compare the light thus received with a reference value to increase the wire feeding rate of the motor M.

In the welding apparatus of this invention, the moving rate of the torch 3 is constant. Therefore, the weld penetration can be maintained constant by the provision of this photo-sensitive means.

The present invention has been described in connection with the use of the plasma torch; however, the torch may be replaced by any torch provided that it, like a TIG (tungsten inert gas) welding torch, can be effectively used as a linear heat source. Furthermore, this invention can be applied also to the welding where metal plates to be joined are somewhat slanted and are welded upward from the bottom thereof.

What is claimed is:

1. A vertical position welding method for butt-welding metal plates which comprises:
   a. positioning metal plates to be welded to form a relatively narrow groove with the edges of said metal plates;
   b. placing front and rear holding members, each made of copper and being of the water cooling type, on the front surface and the rear surface of said metal plates thus positioned so as to define a welding space in said groove and to maintain molten weld metal in said groove;
   c. providing a non consumable electrode torch outside said groove for producing a plasma arc to melt the edges of said metal plates;
   d. continuously feeding a consumable electrode into said welding space;
   e. generating an arc between said consumable electrode and said non-consumable electrode torch to melt said consumable electrode;
   f. generating a plasma arc between said non-consumable electrode torch and said metal plates to be butt-welded; and
   g. applying said plasma arc to said metal plates in said welding space to the entire thickness thereof, thereby accomplishing a desired weld while melting said edges of said metal plates.

2. A method as claimed in claim 1 in which said non-consumable electrode torch and said holding members are moved upward so as to move said welding space upward along said groove.

3. A method as claimed in claim 1 in which a first welding electric source is connected between said non-consumable electrode torch and said consumable electrode, while a second welding electric source is connected between said non-consumable electrode and said metal plates.

4. A vertical position welding apparatus for butt-welding metal plates which comprises:
   a. a front holding member and a rear holding member adapted to slidably hold the front and rear surfaces of said metal plates, respectively, to form a welding space in a groove formed by the adjacent edges of said metal plates, said front holding member having a through-hole;
   b. a non-consumable electrode torch with a nozzle section comprising a shielding nozzle and a restraining nozzle, said torch being fixedly provided in said through-hole of said front holding member for generating a plasma arc so as to melt the edges of said metal plates in said welding space;
   c. a consumable electrode continuously fed into said welding space from above to form a molten metal pool in said welding space;
   d. means for vertically moving all of said non-consumable electrode torch and said front and rear holding members at the same speed to vertically move said welding space, said speed being determined by a melting rate of said metal plates.

5. An apparatus as claimed in claim 4 in which said non-consumable electrode is substantially perpendicular to surface of said front holding member which surface is to be in contact with the front surface of said metal plates.

6. An apparatus as claimed in claim 4, which further comprises a first electric source connected between said non-consumable electrode torch and said metal plates for generating said plasma arc, and a second electric source connected to said non-consumable electrode torch and said consumable electrode for melting the latter to form said molten metal pool in said welding space in said groove, said first electric source being controlled for determining a melting rate of said metal plates suitable for completely melting said edges of said metal plates, said second electric source being controlled so that a rate of producing molten metal from said consumable electrode is matched with said melting rate of said metal plates.

7. An apparatus as claimed in claim 4 in which said non-consumable torch is tilted backward with respect to a surface of said front holding member in contact with said metal plates by forming a torch forwarding angle between a line perpendicular to said surface of said front holding member and the direction of said non-consumable electrode torch, said torch forwarding angle being from 10° to 30°.

8. An apparatus as claimed in claim 7 in which said restraining nozzle section of said non-consumable electrode torch and said front holding member are formed into one unit so as to set a plasma arc generated by said non-consumable electrode torch close to said molten metal pool.

9. An apparatus as claimed in claim 7 in which said shielding nozzle of said non-consumable electrode torch and said front holding member are formed into one unit, and a restraining nozzle of said non-consumable electrode torch is electrically insulated from said one unit.

* * * * *